(12) United States Patent
Kajaria et al.

(10) Patent No.: US 10,895,340 B2
(45) Date of Patent: *Jan. 19, 2021

(54) TRUNK LINE MANIFOLD SYSTEM

(71) Applicant: GE Oil & Gas Pressure Control LP, Houston, TX (US)

(72) Inventors: Saurabh Kajaria, Houston, TX (US); Jason Williams, Houston, TX (US)

(73) Assignee: Vault Pressure Control LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,040

(22) Filed: Oct. 7, 2019

(65) Prior Publication Data

US 2020/0109807 A1    Apr. 9, 2020

Related U.S. Application Data

(63) Continuation of application No. 15/463,451, filed on Mar. 20, 2017, now Pat. No. 10,436,368.

(60) Provisional application No. 62/310,515, filed on Mar. 18, 2016, provisional application No. 62/310,865, filed on Mar. 21, 2016.

(51) Int. Cl.
*F16L 41/03*      (2006.01)
*E21B 43/26*      (2006.01)

(52) U.S. Cl.
CPC ............... *F16L 41/03* (2013.01); *E21B 43/26* (2013.01)

(58) Field of Classification Search
CPC .......... B60P 3/2265; E21B 43/26; F16L 41/03
See application file for complete search history.

(56) References Cited

U.S. PATENT DOCUMENTS

| | | | |
|---|---|---|---|
| 4,391,297 A | 7/1983 | Knight | |
| 8,469,108 B2 | 6/2013 | Kajaria et al. | |
| 8,474,521 B2 | 7/2013 | Kajaria et al. | |
| 8,496,062 B2 | 7/2013 | Kajaria et al. | |
| 8,567,513 B2 | 10/2013 | Lacheny et al. | |
| 8,656,990 B2 | 2/2014 | Kajaria et al. | |
| 8,813,836 B2 | 8/2014 | Kajaria et al. | |
| 8,851,186 B2 | 10/2014 | Shampine | |
| 9,127,545 B2 | 9/2015 | Kajaria et al. | |
| 9,447,671 B2 | 9/2016 | Nguyen et al. | |
| 9,458,688 B2 | 10/2016 | Adkinson et al. | |
| 9,534,465 B2 | 1/2017 | Nguyen et al. | |
| 10,436,368 B2 * | 10/2019 | Kajaria ................. | B60P 3/2265 |

(Continued)

*Primary Examiner* — James G Sayre

(74) *Attorney, Agent, or Firm* — Hogan Lovells US LLP

(57) ABSTRACT

Embodiments of the present disclosure include an apparatus for transporting fluids including a chassis having wheels and a hitch, the hitch arranged at a first end and the wheels arranged at a second end. The apparatus also includes a high pressure trunk line extending along a length of the chassis, the high pressure trunk line having high pressure inlets for coupling one or more lines directing high pressure fluids into the high pressure trunk line. The apparatus includes one or more low pressure lines, the one or more low pressure lines arranged proximate the high pressure trunk line and having suction outlets along the length of the chassis. The apparatus includes an inlet manifold positioned at the second end of the chassis, the inlet manifold being coupled to the one or more low pressure lines to supply a low pressure fluid to the one or more low pressure lines.

20 Claims, 10 Drawing Sheets

(56) References Cited

U.S. PATENT DOCUMENTS

| | | |
|---|---|---|
| 2008/0083530 A1 | 4/2008 | Boyd |
| 2012/0181785 A1 | 7/2012 | Kajaria |
| 2014/0020901 A1 | 1/2014 | Kajaria et al. |
| 2014/0131954 A1 | 5/2014 | Koleilat et al. |
| 2014/0151069 A1 | 6/2014 | Kajaria et al. |
| 2014/0166268 A1 | 6/2014 | Weightman |
| 2015/0184491 A1 | 7/2015 | Kajaria et al. |
| 2015/0292297 A1 | 10/2015 | Kajaria et al. |
| 2015/0345272 A1 | 12/2015 | Kajaria et al. |
| 2016/0123127 A1 | 5/2016 | Walls |
| 2016/0168970 A1 | 6/2016 | Kajaria et al. |
| 2017/0044872 A9 | 2/2017 | Kajaria et al. |
| 2017/0122060 A1 | 5/2017 | Dille |
| 2017/0130885 A1 | 5/2017 | Arizpe |

* cited by examiner

TRUNK LINE MANIFOLD SYSTEM

CROSS-REFERENCE TO RELATED APPLICATIONS

This application is a continuation of U.S. patent application Ser. No. 15/463,451 filed Mar. 20, 2017, titled "TRUNK LINE MANIFOLD SYSTEM," which is now U.S. Pat. No. 10,436,368 issued Oct. 8, 2019, and which claims the benefit of U.S. Provisional Application No. 62/310,515 filed Mar. 18, 2016, titled "Trunk Line Manifold for Hydraulic Fracturing," and U.S. Provisional Application No. 62/310,865, filed Mar. 21, 2016, titled "Trunk Line Manifold for Hydraulic Fracturing," all of which are incorporated by reference in their entireties.

BACKGROUND

1. Field of the Invention

The present disclosure relates to fluid delivery systems and in particular to manifolds for delivering fluids under pressure.

2. Description of Related Art

During well site operations, such as hydraulic fracturing, fluid is directed to pumper trucks for pressurization and subsequent injection into a wellbore. Tubular connections are used to tie low pressure fluid sources to pump inlets and subsequently to inject high pressure fluid into the wellbore. Often, individual tubulars, such as pipes or flexible tubing, are utilized to independently coupled each pumper truck to and from each fluid source, leading to complicated tubing systems at the well site that are subject to vibration, pressure drop, and the like. It is now recognized that improved methods of connecting fluid systems are desired.

SUMMARY

Applicants recognized the problems noted above herein and conceived and developed embodiments of systems and methods, according to the present disclosure, for trunk line manifolds.

In an embodiment an apparatus for transporting fluids includes a chassis having wheels and a hitch, the hitch arranged at a first end and the wheels arranged at a second end. The apparatus also includes a high pressure trunk line extending along a length of the chassis, the high pressure trunk line having a plurality of high pressure inlets for coupling one or more lines directing high pressure fluids into the high pressure trunk line. Furthermore, the apparatus includes one or more low pressure lines, the one or more low pressure lines arranged proximate the high pressure trunk line and having a plurality of suction outlets along the length of the chassis. Also, the apparatus includes an inlet manifold positioned at the second end of the chassis, the inlet manifold being coupled to the one or more low pressure lines to supply a low pressure fluid to the one or more low pressure lines.

In another embodiment a system for directing fluid to a well site includes one or more pumper trucks at a well site where hydraulic fracturing is to be performed. The system also includes a wellbore at the well site, the wellbore including an injection spool for injecting high pressure fluid into the wellbore. The system includes a trailer manifold. The trailer manifold includes a high pressure trunk line. The high pressure trunk line receives pressurized fluid from the one or more pumper trucks at high pressure inlets arranged along a length of the high pressure trunk line. The trailer manifold also includes a low pressure line arranged proximate the high pressure trunk line, the low pressure line receives low pressure fluid different from the pressurized fluid via an inlet manifold. Additionally, the trailer manifold includes a chassis supporting the high pressure trunk line and the low pressure line, the chassis includes a hitch arranged at a first end and wheels arranged at a second end proximate the inlet manifold.

In an embodiment a system for directing fluid to a well site includes one or more pumps, the pumps receiving a low pressure fluid and outputting a high pressure fluid. The system also includes a wellbore at the well site, the wellbore including an injection spool for injecting the high pressure fluid into the wellbore. The system also includes a trailer manifold. In certain embodiments, the trailer manifold includes a high pressure trunk line. The high pressure trunk line receives the high pressure fluid from the one or more pumps at high pressure inlets arranged along a length of the high pressure trunk line. The trailer manifold also includes a chassis supporting at least a portion of the high pressure trunk line, the chassis including a hitch arranged at a first end and wheels arranged at a second end.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include a truck line manifold for distributing fluid at a well site. In certain embodiments, the trunk line manifold includes a chassis that supports a high pressure trunk line and a pair of low pressure lines. In operation, the low pressure lines direct low pressure fluid through suction outlets to pumper trucks. These pumper trucks pressurize the fluid for later use at the well site and direct the pressured, high pressure fluid back to the high pressure trunk line. In certain embodiments, the high pressure trunk line includes high pressure inlets that direct the high pressure fluid into the trunk line. The high pressure inlets are arranged at angles relative to the high pressure trunk line to facilitate mixing and reduce turbulence within the trunk line. The high pressure trunk line includes an outlet for directing the high pressure fluid to a wellbore for injection, for example, during hydraulic fracturing operations. In this manner, multiple high pressure flow lines may be reduced into a single line, thereby simplifying well site configurations and reducing pressure drop, vibration, turbulence, and wash out in fluid lines.

Figure 1:
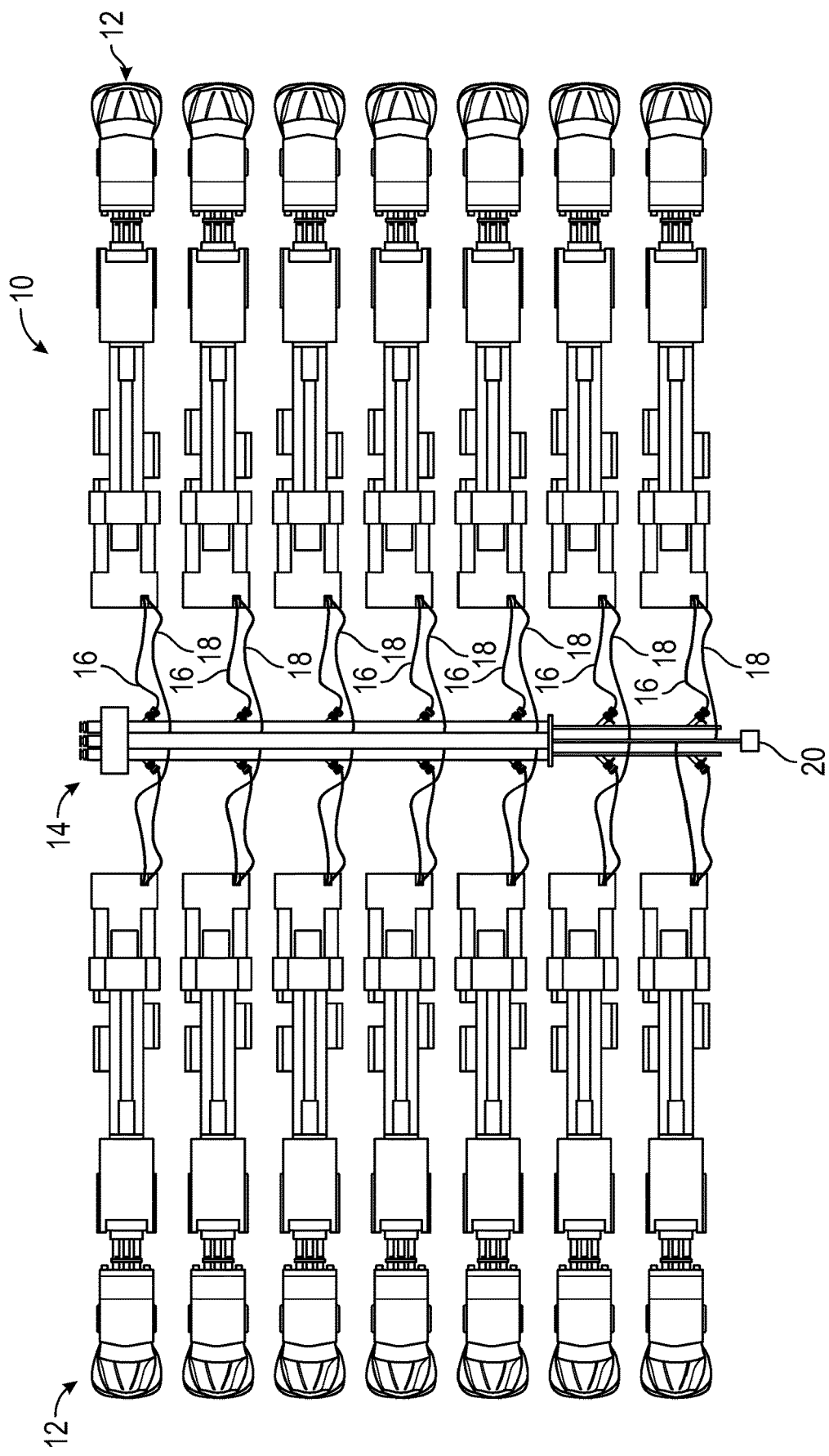
FIG. 1 is a schematic top plan view of an embodiment of a well site, in accordance with embodiments of the present disclosure.

FIG. 1 is a schematic top plan view of a well site 10 including pumper trucks 12 fluidly coupled to a trailer manifold 14. In the illustrated embodiment, there are 14 pumper trucks 12, but it should be appreciated that there may be more of fewer pumper trucks 12. Moreover, while the pumper trucks 12 are illustrated in FIG. 1, in certain embodiments pumps, such as skid mounted pumps, may also be utilized. In operation, the pumper trucks 12 receive a low pressure fluid from the trailer manifold 14 via an inlet line 16 and thereafter pressurize the fluid and direct that fluid toward the trailer manifold 14 via an outlet line 18. The inlet and outlet line 16, 18 may be tubulars formed from metal or other material sufficient for handling the pressure of the fluid in the lines. As will be described below, the lines 16, 18 may be coupled to the trailer manifold 14 via flanged connections, or other connections, to facilitate connection of the lines at the well site 10.

During hydraulic fracturing operations, a fracturing fluid, such as water, is mixed with a proppant, such as silica sand, to stimulate wellbore operations. For example, the fracturing fluid and proppant are injected into a wellbore 20 at high pressures via an injection spool. This high pressure injection may generate fissures in the areas surrounding the wellbore 20. The proppant holds open the fissures to thereby enable oil and gas to freely flow to the wellbore 20 via the fissures.

Figure 2:
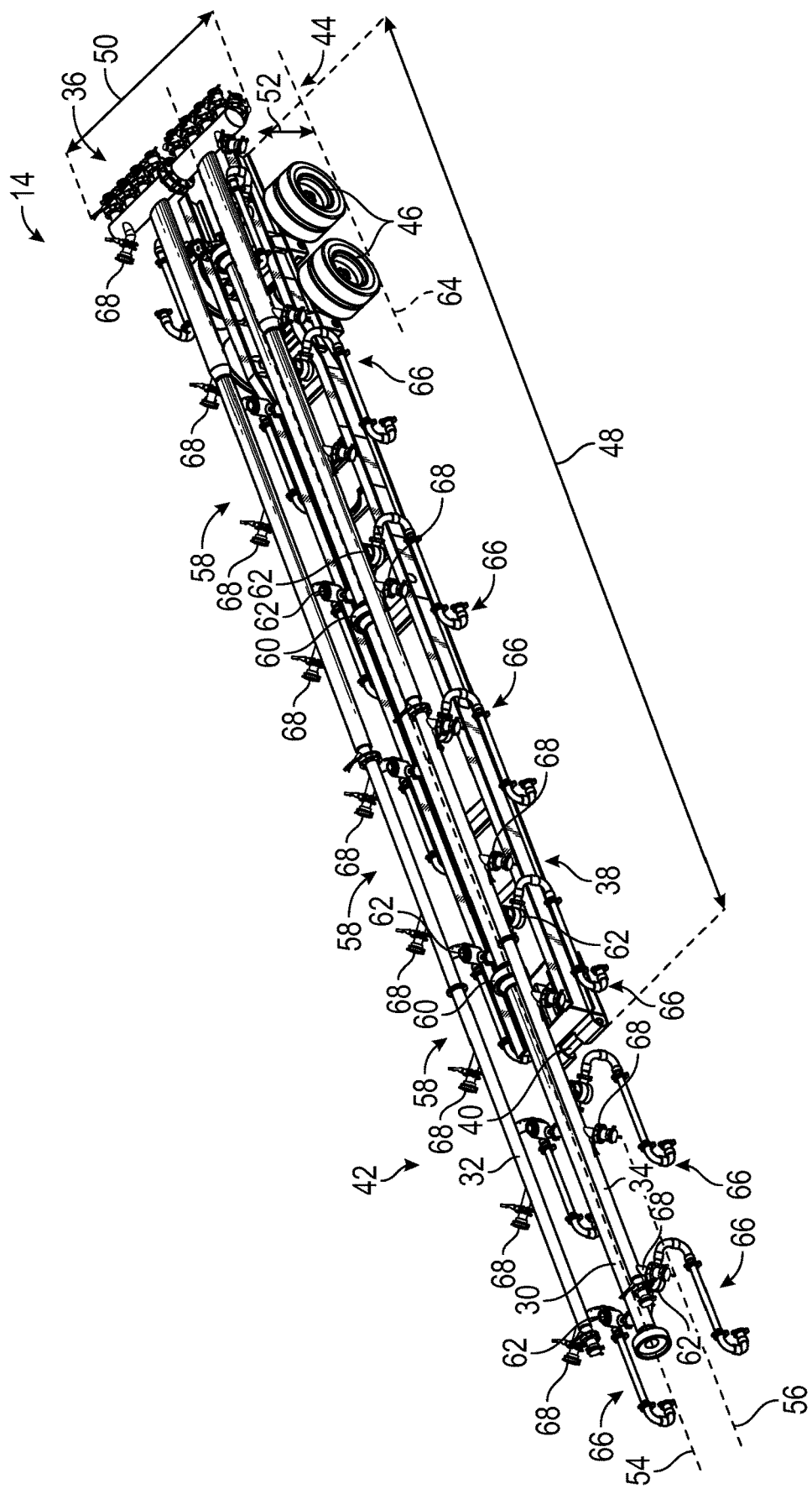
FIG. 2 is a front perspective view of an embodiment of a trailer manifold, in accordance with embodiments of the present disclosure.

FIG. 2 is a front perspective view of an embodiment of the trailer manifold 14. As shown, the trailer manifold 14 includes a high pressure trunk line 30 (e.g., trunk line, high pressure line, etc.), a pair of low pressure lines 32, 34, an inlet manifold 36, and a chassis 38. Moreover, a hitch 40 is positioned at a first end 42 of the chassis 38. The hitch 40 at the first end 42 is opposite the inlet manifold 36 at a second end 44 of the chassis 38. The hitch 40 enables attachment of the trailer manifold 14 to a prime mover, such as a truck. As such, the trailer manifold 14 may be easily moved from location to location along traditional roadways. In the illustrated embodiment, the chassis 38 has wheels 46 proximate to the second end 44. As shown, the chassis 38 maybe referred to as tandem axle and the dimensions may be particularly selected to enable transportation along roadways without having fees for excessive length, width, height, or weight. For example, in certain embodiments, a length 48 may not exceed approximately 16.1 meters (approximately 53 feet), a width 50 may not exceed approximately 2.5 meters (approximately 8.5 feet), and a height 52 may not exceed approximately 4.1 meters (approximately 13.5 feet). Furthermore, the chassis 38 may be equipped with systems and controllers to enable operation on roadways, such as anti-lock brakes, air systems, parking brakes, LED road lights, and/or CMVSS/FMVSS approved modular harnesses. However, it should be appreciated that the chassis 38 may be omitted in certain embodiments and the high pressure trunk line 30, and related components, may be mounted onto one or more skids or other type of platform. Therefore, components of the chassis 38 such as pipe racks or lifts may also be incorporated into the one or more skids or platform.

In the illustrated embodiment, the high pressure trunk line 30 extends along a central portion of the chassis 38 and a trunk line axis 54 is substantially aligned with a chassis axis 56. In other words, the trunk line 30 may be centered on the chassis 38, thereby enabling even weight distribution for movement of the trailer manifold 14. On each side proximate the trunk line 30 are the low pressure lines 32, 34. In certain embodiments the low pressure lines 32, 34 are evenly spaced from the trunk line 30. As such, the trailer manifold 14 may be substantially symmetrical about the chassis axis 56. However, as noted above, embodiments of the present disclosure may include mounting the high pressure trunk line 30, the low pressure line 32, 34, and/or the inlet manifold 36 on one or more skids or platforms. Accordingly, references to the chassis length 48, chassis axis 56, and the like are applicable to embodiments include the one or more skids. For example, the chassis length 48 may correspond to a skid length.

As will be described in detail below, the trunk line 30 includes a plurality of trunk line segments 58, each having a connector 60 at the ends, such as a flange. In embodiments where the trunk line segments 58 include flanged connectors, the segments 58 may be easily replaced, for example, due to washing out. As such, components of the trunk line 30 and/or the trailer manifold 14 may be easily replaced, thereby enabling faster repairs and more flexibility at well sites. In the illustrated embodiment, the trunk line 30 further includes high pressure inlets 62 for connecting to the outline lines 18 of the pumper trucks 12. The high pressure inlets 62 are arranged along the sides of the trunk line 30, in the illustrated embodiment, such that the high pressure inlets 62 are substantially parallel to a ground plane 64. Furthermore, as shown, the high pressure inlets 62 are coupled to spools 66, such as safety irons, to facilitate connection to the outlet lines 18. In the illustrated embodiments, the spools 66 have an "S" configuration. Moreover, as shown, the connections leading to the high pressure inlets 62 may all be flanged, thereby enabling easy connections and replacement of components. Moreover, it should be appreciated that other components, such as check valves, pressure relief valves, flow valves (manual or actuated) may be arranged between the high pressure inlets 62 and the spools 66 or upstream of the spools 66. As will be described below, in the illustrated embodiment, a portion of the trunk line 30 is extending off of the chassis 38 in a cantilevered fashion. This configuration increases the flexibility of use for the trailer manifold 14, as well as provides options for connecting components to the trunk line 30.

The trailer manifold 14 also includes the low pressure lines 32, 34. The low pressure line 32, 34 include suction outlets 68 for directing low pressure fluids to the pumper trucks 12 along the inlet lines 16. The illustrated embodiment includes 20 suction outlets 68, however, in other embodiments, there may be more or fewer suction outlets 68. Moreover, each low pressure line 32, 34 may not include the same number of suction outlets 68. For example, the low pressure line 32 may have more or fewer suction outlets 68 than the low pressure line 34. The low pressure lines 32, 34 run the length 48 of the chassis 38 and also extend off of the first end 42 of the chassis 38 in a cantilevered fashion. Moreover, each low pressure line 32, 34 is fluidly coupled to the inlet manifold 36, which supplies fluid for later use by the pumper trucks 12.

Figure 3:
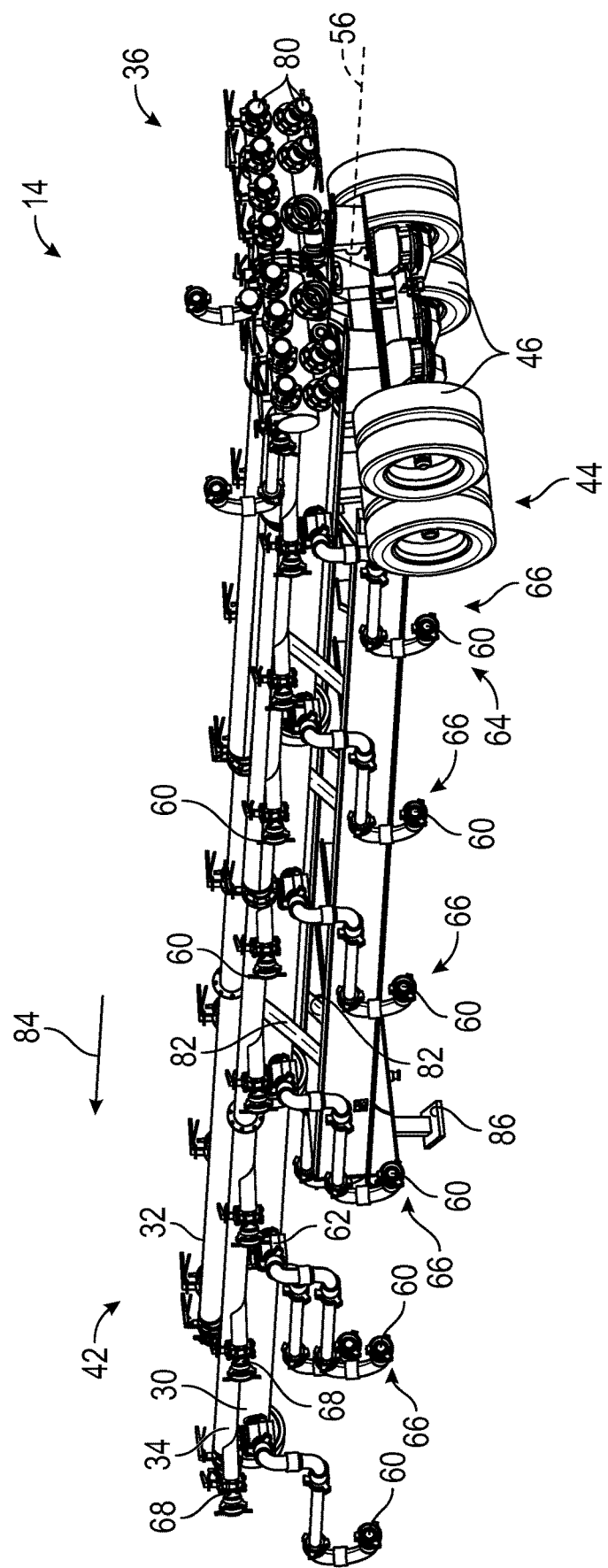
FIG. 3 is a rear perspective view of the trailer manifold of FIG. 2, in accordance with embodiments of the present disclosure.

FIG. 3 is a rear perspective view of the trailer manifold 14. In the illustrated embodiment, the inlet manifold 36 includes 12 fluid inlets 80, however, in certain embodiments, the inlet manifold 36 may include more or fewer fluid inlets 80. As described above, the inlet manifold 36 receives fluid, such as fracking fluid, for distribution to the low pressure lines 32, 34 for subsequent use by the pumper trucks 12. The inlet manifold 36 is arranged at the second end 44 of the chassis 38.

In the illustrated embodiment, the low pressure lines 32, 34 are arranged at a higher elevation, relative to the ground plane 64, than the high pressure trunk line 30. However, it should be appreciated that, in other embodiments, the high pressure trunk line 30 may be at a higher elevation or an equal elevation to the low pressure lines 32, 34. The position of the lines 30, 32, 34 relative to one another may be particularly selected to accommodate the well site 10 configuration. That is, the relative locations of the lines 30, 32, 34 may be particularly selected to facilitate connections to other components at the well site 10. In certain embodiments, the chassis 38 includes one or more supports 82 for supporting the high pressure trunk line 30 and/or low pressure lines 32, 34.

As shown in FIG. 3, the suction outlets 68 are arranged at an angle, relative to the low pressure line 34, in a direction toward the first end 42. In other words, as fluid flows from the inlet manifold 36 through the low pressures lines 32, 34 in a direction 84 represented by the arrow, the suction outlets 68 are positioned at the angle to direct the fluid through the suction outlets 68 along the direction 84 that the fluid is flowing, thereby reducing friction and turbulence of the fluid as the fluid is directed out of the suction outlets 68 and to the pumper trucks 12. It should be appreciated that, in other embodiments, the suction outlets 68 may be arranged at different positions, such as perpendicular to the lines 32, 34, at a bottom of the line 32, 34, at a top of the lines 32, 34, or at any other reasonable location and orientation.

In the illustrated embodiment, the low pressure lines 32, 34 include the connectors 60. In certain embodiments, the connectors 60 may be flanged, threaded, clamped, or any other suitable connection. As described above, using a flanged or clamped connection enables faster connections while also providing metal to metal sealing surfaces for the components.

Referring to the high pressure trunk line 30, the spools 66 are illustrated as extending off of the high pressure inlets 62. In the illustrated embodiment, the spools 66 are arranged in a variety of configurations to enable coupling of the outlet lines 18 to the trunk line 30. As shown, the spools 66 are in the "S" configuration and including connectors 60 and individual, replaceable spool components. As a result, in the event a portion of the spool 66 is washed out or damaged, the component may be readily replaced. Moreover, in the illustrated embodiment, threaded connections may be reduced and/or eliminated, thereby improving reliability with the connections.

In certain embodiments, the chassis 38 includes a leg 86 that may be retractable. The leg 86 is arranged to extend down to the ground plane 64 when the chassis 38 is not being hauled by the prime mover and to retract when the chassis 38 is being hauled by the prime mover. In this manner, the leg 86 may support the chassis 38 and provide additional stability during operations at the well site 10.

Figure 4:
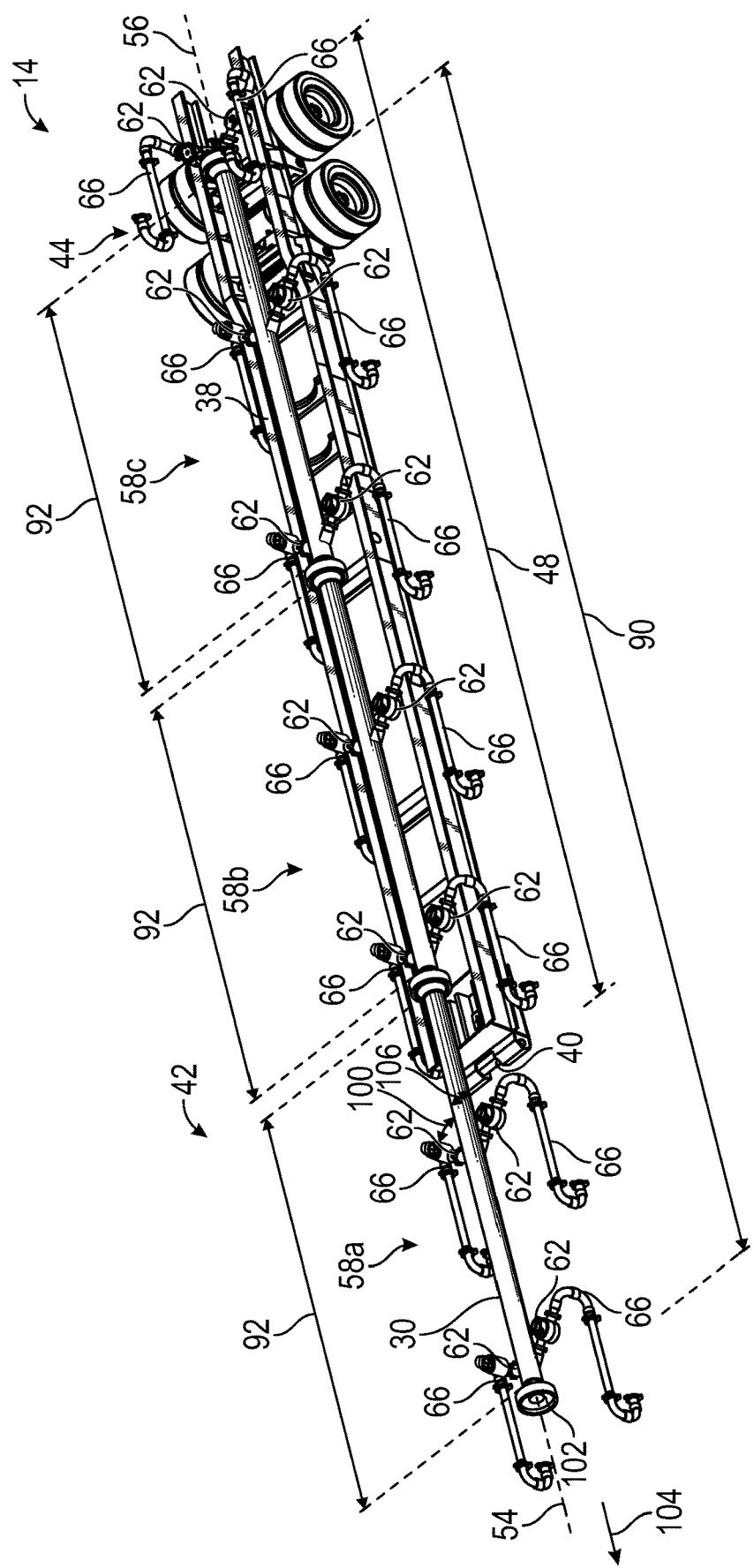
FIG. 4 is a partial front perspective view of the trailer manifold of FIG. 2, in accordance with embodiments of the present disclosure.

FIG. 4 is a front perspective view of the trailer manifold 14 in which the low pressure lines 32, 34 have been removed for clarity. As described above, the high pressure trunk line 30 is arranged along the length 48 of the chassis 38 and further extends off of the first end 42. In the illustrated embodiment, the trunk line 30 has a trunk line length 90 that is greater than the chassis length 48. Moreover, each trunk line segment 58 has a segment length 92. As will be appreciated, the sum of the segment lengths 92 is equal to the trunk line length 90. It should be appreciated that, when moving the trailer manifold 14, the trunk line segment 58a may be removed and positioned on the chassis 38, for example, in a pipe rack, to enable coupling to the prime mover and transportation to a different location. In the illustrated embodiment, the high pressure inlets 62 are arranged at an angle 100 relative to the trunk line axis 54. In operation, fluid (e.g., high pressure fluid) flows through the outlet lines 18 from the pumper trucks 12 and into the high pressure trunk line 30 via the high pressure inlets 62. After entering the high pressure trunk line 30, the fluid is directed toward the outlet 102, moving in the downstream direction 104, as represented by the arrow. Arranging the high pressure inlets 62 at the angle 100 enables the fluid to enter the high pressure trunk line 30 in a direction substantially parallel to the downstream direction 104. As a result, there is a reduced likelihood of impingement on the opposite side of the high pressure trunk line 30. Moreover, friction may be reduced because the fluid will not turn or change direction with such severity as, for example, an inlet perpendicular to the trunk line 30. Furthermore, as will be described below, turbulence may be reduced by positioning the high pressure inlets 62 at the angle 100. The angle 100 may be any suitable angle relative to the trunk line axis 54, such as approximately 10 degrees, approximately 20 degrees, approximately 30 degrees, approximately 40 degrees, approximately 50 degrees, approximately 60 degrees, approximately 70 degrees, approximately 80 degrees, or any other suitable angle.

As described above, the spools 66 are coupled to the high pressure inlets 62 via a flanged or clamped connection, in the illustrated embodiment. As a result, threaded fittings proximate the high pressure trunk line 30 may be reduced or eliminated. Furthermore, the spools 66 illustrated in FIG. 4 include the "S" shaped bend to enable different configurations and directions to ease coupling at the well site 10. For example, rigid tubing or hosing may form the outlet line 18. If the outline line 18 is routed in such a way that it is difficult to connect to the spools 66, the configuration and/or the position of the spools 66 may be easily modified to enable connections, thereby reducing time to prepare the system for use. Additionally, other components may be included along the high pressure inlets 62, such as instrumentation systems and tie-ins, check valves, or the like. For example, check valves may be arranged upstream of the high pressure inlets 62, and in certain embodiments upstream of the spools 66, to block the high pressure trunk line 30 from draining when the pumper trucks 12 are disconnected. These check valves may be ball check valves, diaphragm check valves, swing check valves, stop-check valves, lift-check valves, in-line check valves, duckbill valves, or pneumatic non-return valves. Moreover, the check valves may be manual or actuated. Furthermore, other systems may also be incorporated to correspond with the high pressure trunk line 30, such as over pressure protection mechanisms. For example, the over pressure protection mechanisms could include pressure relief valves (e.g., relief valves, safety valves, etc.), burst discs (e.g., rupture discs) or the like. For example, the pressure relief valve may be coupled to the high pressure line to safeguard again pressure spikes. In certain embodiments, the outlet of the over pressure protection mechanism may direct over-pressured fluid to a containment vessel or other suitable location.

In the illustrated embodiment, the trailer manifold 14 includes a single high pressure trunk line 30, thereby reducing or eliminating drawbacks associated with multiple high pressure lines at the well site 10. For example, in systems that include multiple high pressure lines coupling at the well site 10, for example, at the tree or injection point, significant vibration may occur from the flow coming in at different directions and/or angles. Moreover, wash out may occur due to the turbulence generated by combining different flows together at the tree or injection point. Furthermore, multiple, smaller lines suffer increased pressure drop, thereby reducing the effectiveness of the fracturing operation. In sharp contrast, the single high pressure trunk line 30 of the illustrated embodiment has a diameter 106 sufficient to provide fracturing fluid to the well site 10 that is the equivalent or greater than multiple smaller lines. Furthermore, the high pressure trunk line 30 has the single outlet 102 and reduces turbulence within the high pressure trunk line 30 due to the configuration of the high pressure inlets 62. As a result, there is less turbulence, less pressure drop, and reduced washout at the injection point. Furthermore, as described above, the connectors 60 may be flanged or clamped, thereby forming metal to metal seals between components to reduce the likelihood of leaks and reduce maintenance events.

Figure 5:
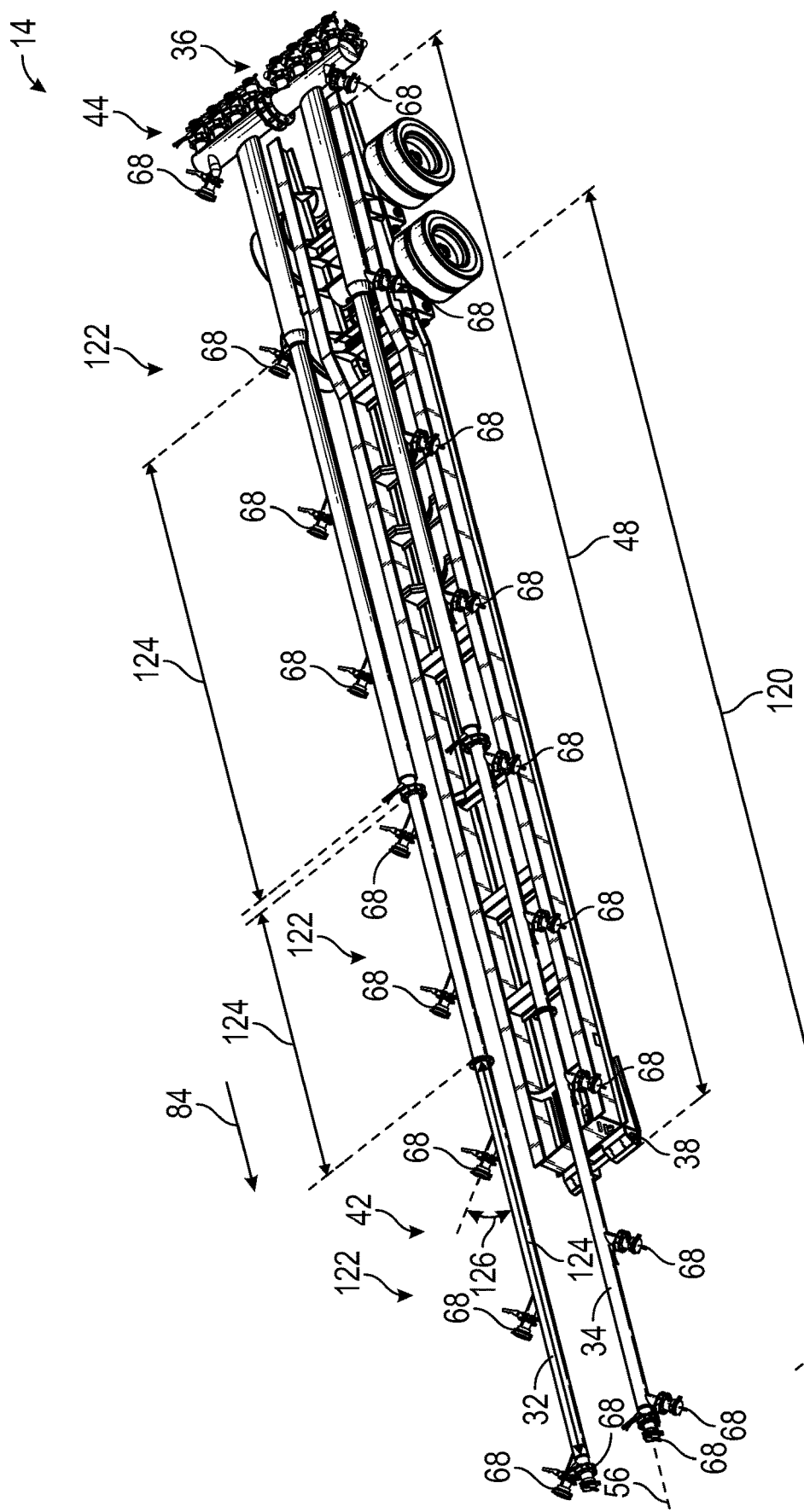
FIG. 5 is a partial front perspective view of the trailer manifold of FIG. 2, in accordance with embodiments of the present disclosure.

FIG. 5 is a front perspective view of the trailer manifold 14 in which the high pressure trunk line 30 has been removed for clarity. In the illustrated embodiment, the low pressure lines 32, 34 are arranged along the length 48 of the chassis 38 and extend away from the first end 42. In the illustrated embodiment, the low pressure lines 32, 34 have a low pressure line length 120. Furthermore, as shown in FIG. 5, the low pressure lines 32, 34 are formed from low pressure segments 122, each having a low pressure segment length 124. The segments 122 include the connectors 60 at the end to facilitate replacement or removal of sections of the low pressure lines 32, 34. For example, the connectors 60 may be flanged or clamped to facilitate quick and efficient connections and disconnections. In the illustrated embodiment, multiple suction outlets 68 are arranged on each low pressure segment 122. However, in other embodiments, each low pressure segment 122 may include a single suction outlet 68. Each of the low pressure lines 32, 34 are coupled to the inlet manifold 36, which directs fluid into each of the lines 32, 34. As described above, the suction outlets 68 are utilized to direct low pressure fluid to the pumper trucks 12 via the inlet lines 16. The suction outlets 68 are arranged at an angle 126 with respect to the chassis axis 56 to thereby facilitate directing the fluid out of the line 32, 34 through the suction outlets 68. For example, as described above, by pointing the suction outlets 68 along the direction of fluid flow 84, turbulence, wash out, and vibration may be decreased. In certain embodiments, the supports 82 are utilized to support the low pressure lines 32, 34, but the supports 82 have also been removed for clarity.

Figure 6:
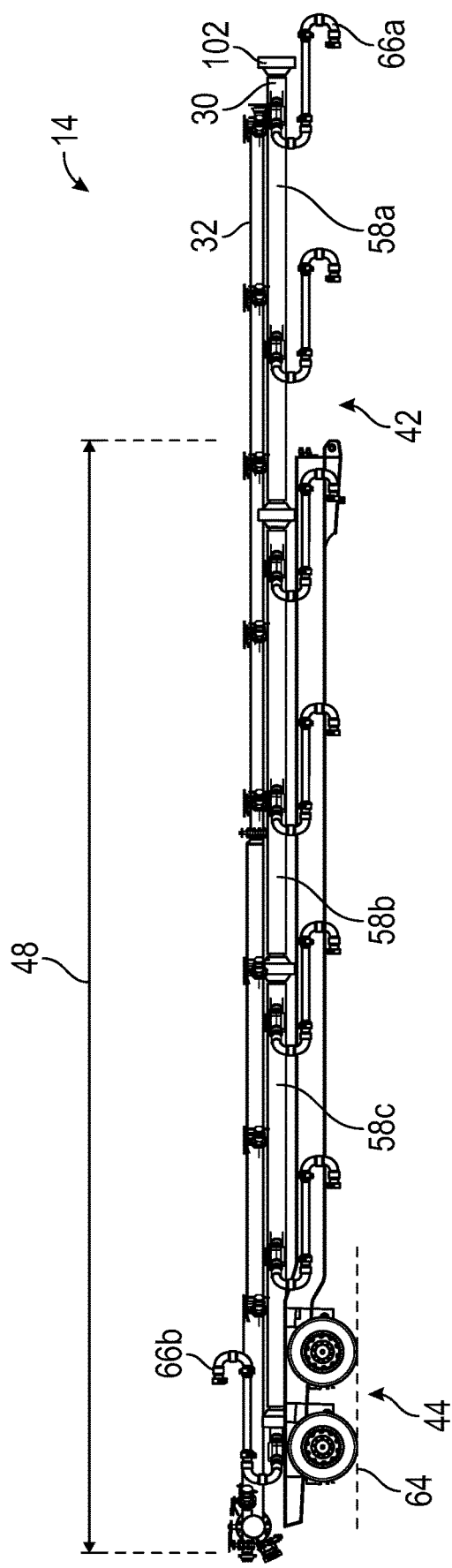
FIG. 6 is a side elevational view of the trailer manifold of FIG. 2, in accordance with embodiments of the present disclosure.

FIG. 6 is a side elevational view of the trailer manifold 14. In the illustrated embodiment, the high pressure trunk line 30 is shown extending along a length 48 of the chassis 38 and further extending beyond the first end 42. That is, the trunk line length 90 is greater than the chassis length 48. By extending beyond the chassis 38, the configuration at the well site 10 includes additional options because, for example, the extending trunk line segment 58a may be supported by a pipe stand, hydraulic jack, or any other reasonable structure. Moreover, in certain embodiments, the outlet 102 may be tied directly into the injection point which provides sufficient support for the trunk line segment 58a.

In the illustrated embodiment, the low pressure line 32 is at a higher elevation, relative to the ground plane 64, than the high pressure trunk line 30. However, it should be appreciated that, in other embodiments, the high pressure trunk line 30 may be at an elevation equal to or greater than the low pressure line 32. FIG. 6 illustrates the variety of configurations that the spools 66 may be positioned in. For example, the spool 66a is arranged such that an inlet is positioned at a lower elevation than the high pressure trunk line 30. In contrast, the spool 66b is arranged such that an inlet is positioned at a higher elevation than the high pressure trunk line 30. In this manner, different configurations of the spools 66 may facilitate making connections to the high pressure trunk line 30.

Figure 7:
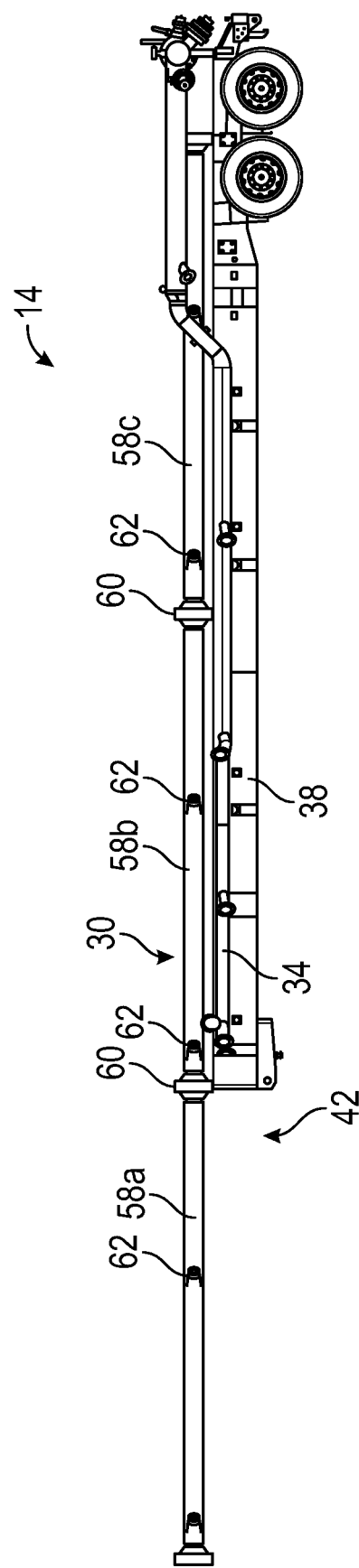
FIG. 7 is a partial side elevational view of an embodiment of a trailer manifold, in accordance with embodiments of the present disclosure.

FIG. 7 is a partial side elevational view of the trailer manifold 14. In the illustrated embodiment, the first end 42 is illustrated while the second end 44 is removed for clarity. As described above, trunk line segments 58 are connected via the connectors 60. In the illustrated embodiment, the trunk line segment 58b includes two sets of high pressure inlets 62. However, as described above, in certain embodiments each trunk line segment 58 may include a single pair of high pressure inlets 62, or a single high pressure inlet 62. As shown, the trunk line segment 58a extends beyond the chassis 38. Moreover, in the illustrated embodiment, the low pressure line 34 is arranged at an elevation lower than the high pressure trunk line 30. But as described above, in other embodiments the high pressure trunk line 30 may be at the same elevation or lower than the low pressure line 34.

Figure 8:
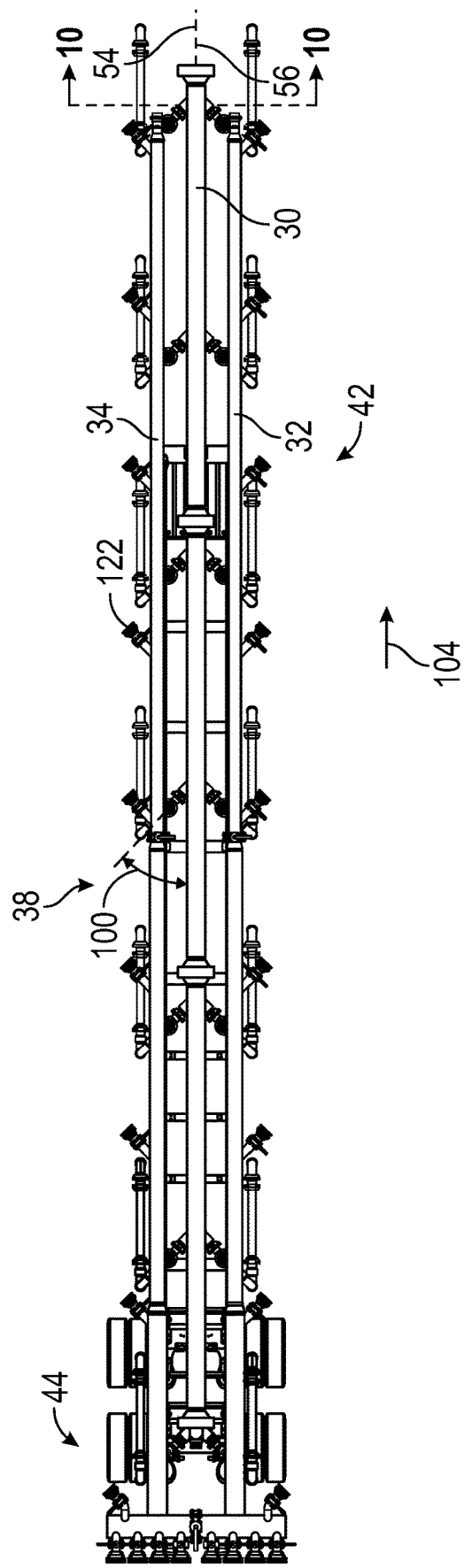
FIG. 8 is a top plan view of the trailer manifold of FIG. 2, in accordance with embodiments of the present disclosure.

FIG. 8 is a top plan view of the trailer manifold 14. In the illustrated embodiment, the chassis axis 56 is substantially aligned with the trunk line axis 54. In other words, the high pressure trunk line 30 is substantially centered on the chassis 38. Moreover, the low pressure line 32, 34 are arranged substantially symmetrically about the trunk line 30. As will be appreciated, this arrangement may facilitate hauling of the trailer manifold 14 on roadways due to the balanced weight configuration. Moreover, vibration may be reduced due to the balanced configuration. In the illustrated embodiments, the high pressure inlets 62 are illustrated at the angle 100 described above to thereby direct the high pressure fluid along the flow direction 104. Additionally, the high pressure inlets 62 extend to the sides of the high pressure trunk line 30 such that the high pressure inlets 62 are substantially parallel to the ground plane 64. However, it should be appreciated that, in other embodiments, the high pressure inlets 62 may be arranged at other positions around the circumference of the trunk line 30. Furthermore, as illustrated, the spools 66 are arranged to extend outwardly from the low pressure lines 32, 34. However, it should be appreciated that, in certain embodiments, the spools 66 may be substantially aligned with the low pressures lines 32, 34 or positioned inward from the low pressure lines 32, 34. Furthermore, as shown in FIG. 8, the suction outlets 68 are arranged at the angle 122 to facilitate directing the low pressure fluid to the pumper trucks 12.

Figure 9:
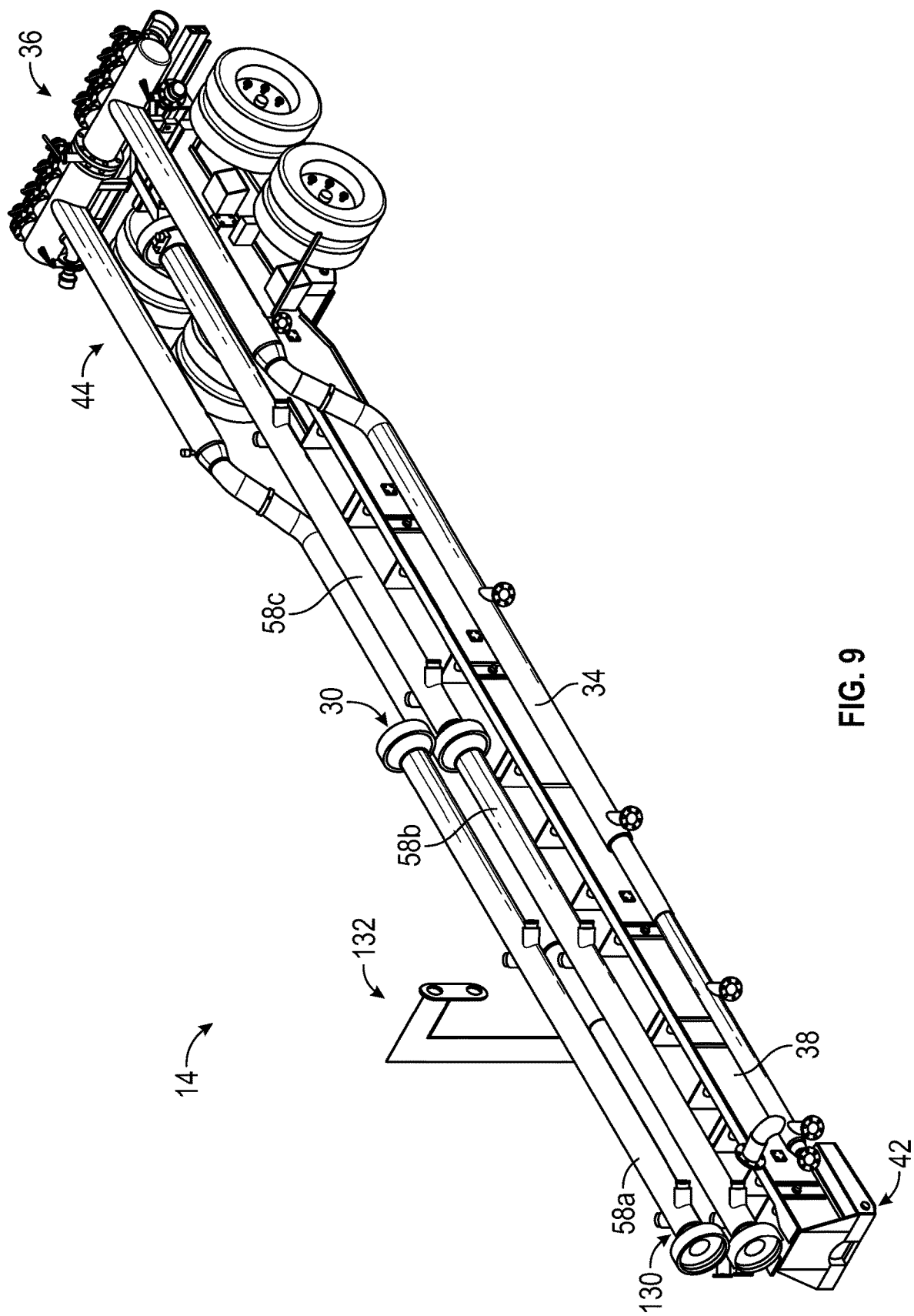
FIG. 9 is a front perspective view of an embodiment of a trailer manifold, in accordance with embodiments of the present disclosure.

FIG. 9 is a front perspective view of the trailer manifold 14 in which the trunk line segment 58a has been removed and stacked on the chassis 38. As described above, in certain embodiments the trunk line segment 58a will end beyond the first end 42 of the chassis 38 when coupled to the trunk line segment 58b. In operation, this provides flexibility to the layout of the well site 10. However, during hauling operations, the trunk line segment 58a is removed to enable the hitch 40 to couple to the prime mover. In the illustrated embodiment, the trunk line segments 58a, 58b can be coupled via the connectors 60. As a result, the segment 58a, 58b can be quickly disconnected and the trunk line segment 58a may be stored on the chassis 38 for transportation. In certain embodiments, the chassis 38 includes a pipe rack 130 for supporting the trunk line segment 58a. Moreover, in certain embodiments, the chassis 38 may further include a lift 132 to facilitate removal and storage of the trunk line segment 58a. For example, the lift 132 may be positioned to articulate along the length 48 of the chassis 38. In the illustrated embodiment, the lift 132 is a type of crane or suspended gripper that enables engagement of the trunk line segment 58a. It should be appreciated that, in certain embodiments, the lift 132 may not be coupled to the chassis 38. For example, the lift 132 may be separate equipment at the well site 10 that is utilized when desired.

Storing the trunk line segment 58a on the chassis 38 leads to a more compact, streamlined trailer manifold 14. For example, in embodiments where the extra length of the trunk line segment 58a is not used, the trunk line segment 58a may remain on the chassis 38, thereby reducing the number of connections being made to the trailer manifold 14. Moreover, when not in use, the pipe rack 130 can hold replacement parts or the like to facilitate operation of the trailer manifold 14.

Figure 10:
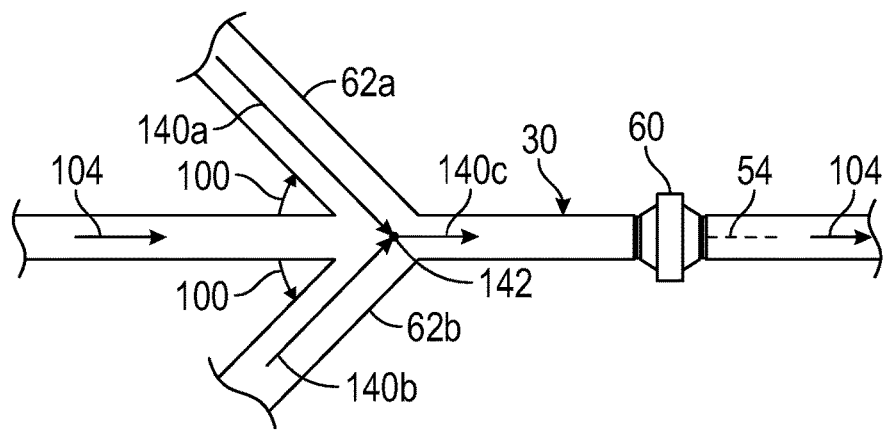
FIG. 10 is a cross-sectional top plan view taken along line 10-10, in accordance with embodiments of the present disclosure.

FIG. 10 is a top plan cross-sectional view taken along line 10-10. In the illustrated embodiment, the high pressure inlets 62 are arranged on the high pressure trunk line 30 at the angle 100. As described above, the high pressure inlets 62 are positioned at the angle 100 to facilitate mixing in the trunk line 30 to thereby reduce turbulence when the fluid is injected at the well site 10. Furthermore, positioning the high pressure inlets 62 at the same angle 100 facilitates contact of the fluid within the trunk line 30 to reduce impingement on the trunk line 30. In the illustrated embodiment, the high pressure inlet 62a directs a fluid represented by the arrow 140a toward the fluid 140b directed into the trunk line 30 via the high pressure inlet 62b. As shown, the fluid streams 140a, 140b contact at a contact point 142. This contact point 142 reduces the eddies in the fluid and further directs the force of the fluid streams 140a, 140b away from the wall of the trunk line 30 by dissipating the force at the contact point 142. As a result, the turbulence in the flow is reduced downstream as the fluid streams 140a, 140b join to form the fluid stream 140c moving in the flow direction 104.

Figure 11:
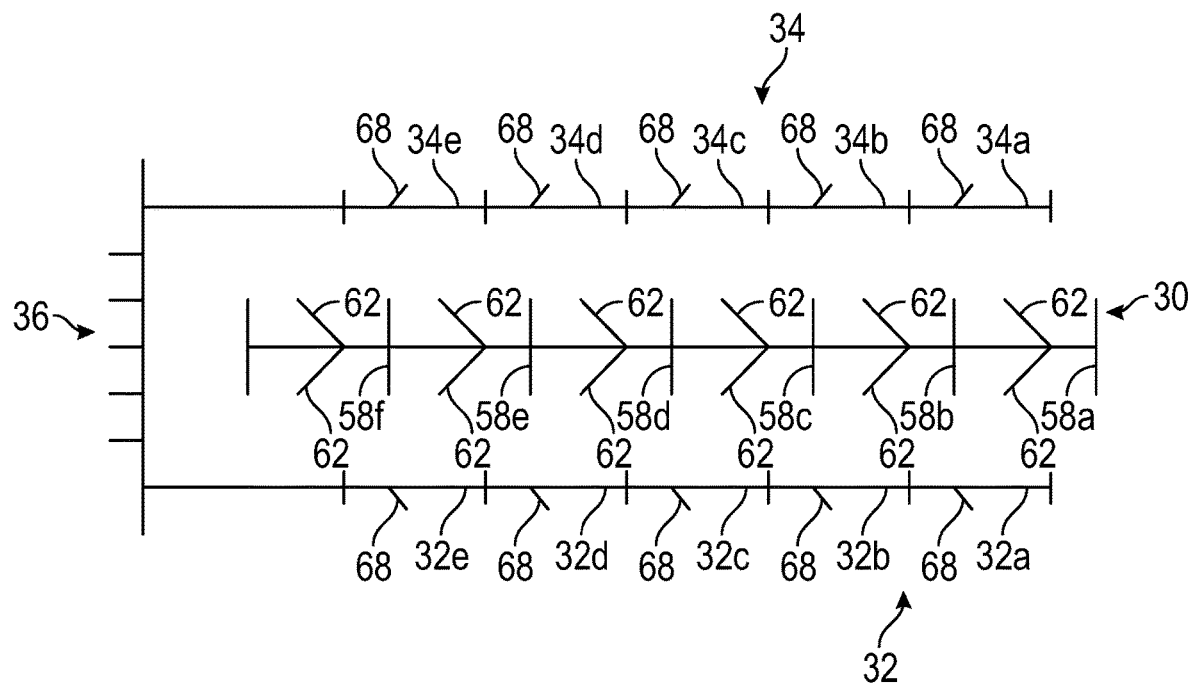
FIG. 11 is a schematic top plan view of a piping arrangement, in accordance with embodiments of the present disclosure.

FIG. 11 is a schematic top plan view of the trailer manifold 14 illustrating the high pressure trunk line 30 and low pressure lines 32, 34. As described above, in certain embodiments, the trunk line 30 is formed by trunk line segments 58 that are coupled together via the connectors 60. Furthermore, in certain embodiments, the low pressures lines 32, 34 are formed by low pressure segments 122 coupled together via the connectors 60. In the illustrated embodiment, the high pressure trunk line 30 is formed by six trunk line segments 58 each having a pair of high pressure inlets 62. As a result, if one section of the high pressure trunk line 30 is damaged or needs to be repaired, the individual segment 58 may be removed while the remaining portions are reused, thereby reducing the cost of maintenance. Additionally, in the illustrated embodiment, each low pressure segment 124 includes a single suction outlet 68. In a similar manner to the trunk line 30, the low pressure segments 124 may also be individually removed and replaced during maintenance operations. As described above, the connectors 60 may be flanged or clamped to provide additional sealing capacity and reduce the likelihood of leaks.

As described in detail above the trailer manifold 14 includes the high pressure trunk line 30 for collecting and distributing high pressure fluid from one or more pumper trucks 12 to the wellbore 20. In certain embodiments, the high pressure trunk line 30 is positioned on the chassis 38 and includes the high pressure inlets 62 to direct the high pressure fluid into the trunk line 30. Furthermore, in certain embodiments, the high pressure inlets 62 are arranged at angles relative to the trunk line 30 to thereby facilitate mixing and settling of the high pressure fluid upstream of the wellbore 20, thereby reducing turbulence and potential wash out during injection. Additionally, the trailer manifold 14 includes the inlet manifold 36 for supplying low pressure fluid to the low pressure lines 32, 34. In certain embodiments, the low pressure lines 32, 34 include the suction outlets 68 to provide low pressure fluid to the pumper trucks 12. Certain embodiments of the system include flanged or clamped connections that enable faster connections as well as increased flexibility regarding maintenance operations. For example, in embodiments where the high pressure trunk line 30 is formed from the trunk line segments 58, if a certain segment 58 was undergoing maintenance operations, the remaining segments 58 could be reused. In this manner, high pressure fluid may be collected and provided to the wellbore 20 with reduced piping complexity at the well site 10, reduced vibration, reduced friction, reduced pressure drop, and reduced turbulence.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for directing fluid to a well site, comprising:
one or more pumps, the pumps receiving a low pressure fluid and outputting a high pressure fluid;
a wellbore at the well site, the wellbore receiving the high pressure fluid; and
a manifold, the manifold comprising:
a high pressure trunk line having a single outlet, the high pressure trunk line receiving the high pressure fluid from the one or more pumps at high pressure inlets arranged along a length of the high pressure trunk line, and
one or more skids supporting at least a portion of the high pressure trunk line, the one or more skids positioning the high pressure trunk line above a ground plane, wherein at least some of the high pressure inlets are arranged on a segment of the high pressure trunk line that extends longitudinally past a skid of the one or more skids.

2. The system of claim 1, further comprising:
a plurality of spools, wherein one spool of the plurality of spools is coupled to at least one high pressure inlet, the spools having one or more connectors for coupling to the at least one high pressure inlet.

3. The system of claim 1, wherein the high pressure inlets are positioned at an angle with respect to a trunk line axis, the angle directing the high pressure fluid entering the high pressure inlets into the high pressure trunk line in a direction substantially parallel to a high pressure flow direction.

4. The system of claim 1, further comprising:
a pipe stand, the pipe stand receiving and supporting at least a portion of the high pressure trunk line extending past the skid of the one or more skids, the pipe stand positioning the trunk line segment above a second trunk line segment.

5. The system of claim 1, wherein the high pressure trunk line comprises one or more trunk line segments, the trunk line segments being coupled together via one or more connectors.

6. The system of claim 5, wherein the one or more connectors include a flange, a clamp, or a combination thereof.

7. The system of claim 1, wherein the high pressure inlets include a plurality of high pressure inlets, the high pressure inlets arranged in pairs along the length of the high pressure trunk line, the pairs positioned to be substantially symmetrical about a trunk line axis.

8. The system of claim 1, further comprising:
a lift, positioned proximate the high pressure trunk line and articulating along a length of the one or more skids, the lift positioned to engage at least a portion of the high pressure trunk line.

9. A fluid transportation system, comprising:
a chassis having wheels; and
a common high pressure trunk line extending along a length of the chassis, the common high pressure trunk line having a plurality of high pressure inlets for coupling one or more lines directing high pressure fluids into the high pressure trunk line, at least a portion of the plurality of high pressure inlets arranged on a segment of the high pressure trunk line that extends longitudinally farther than the length of the chassis, and a single outlet.

10. The system of claim 9, further comprising:
a plurality of spools, wherein one spool of the plurality of spools is coupled to at least one high pressure inlet, the spools having one or more connectors for coupling at least one high pressure inlet of the plurality of high pressure inlets.

11. The system of claim 9, wherein plurality of high pressure inlets are positioned at an angle with respect to a trunk line axis, the angle directing the high pressure fluid entering the plurality of high pressure inlets into the high pressure trunk line in a direction substantially parallel to a high pressure flow direction.

12. The system of claim 9, further comprising:
a pipe stand, the pipe stand receiving and supporting at least a portion of the high pressure trunk line extending past the chassis, the pipe stand positioning the trunk line segment above a second trunk line segment.

13. The system of claim 9, wherein the common high pressure trunk line comprises one or more trunk line segments, the trunk line segments being coupled together via one or more connectors.

14. The system of claim 13, wherein the one or more connectors include a flange, a clamp, or a combination thereof.

15. The system of claim 9, wherein the plurality of high pressure inlets are arranged in pairs along a length of the high pressure trunk line, the pairs positioned to be substantially symmetrical about a trunk line axis.

16. A system for directing fluid to a well, comprising:
a first skid, arranged proximate the well, the first skid having a first skid length;
a second skid, arranged proximate the first skid, the second skid having a second skid length, wherein a total skid length at least equal to the first skid length plus the second skid length; and
a common high pressure trunk line extending for a trunk line length, the trunk line length being greater than the total skid length such that at least a portion of the common high pressure trunk line extends beyond an end of the second skid, the common high pressure trunk line including a plurality of high pressure includes for coupling one or more lines directing high pressure fluids into the high pressure trunk line, at least a portion of the plurality of high pressure inlets arranged on the portion of the common high pressure trunk line extending beyond the end of the second skid.

17. The system of claim 16, further comprising:
a plurality of spools, wherein one spool of the plurality of spools is coupled to at least one high pressure inlet, the spools having one or more connectors for coupling at least one high pressure inlet of the plurality of high pressure inlets.

18. The system of claim 16, wherein plurality of high pressure inlets are positioned at an angle with respect to a trunk line axis, the angle directing the high pressure fluid entering the plurality of high pressure inlets into the high pressure trunk line in a direction substantially parallel to a high pressure flow direction.

19. The system of claim 16, further comprising:
a pipe stand, the pipe stand receiving and supporting at least a portion of the high pressure trunk line extending beyond the end of the second skid, the pipe stand positioning the trunk line segment above a second trunk line segment.

20. The system of claim 16, wherein the common high pressure trunk line comprises one or more trunk line segments, the trunk line segments being coupled together via one or more connectors.

* * * * *